US006844644B2

(12) United States Patent
Arimitsu (10) Patent No.: US 6,844,644 B2
(45) Date of Patent: Jan. 18, 2005

(54) ELECTRIC ROTATING MACHINE AND ITS CONNECTING METHOD

(75) Inventor: Minoru Arimitsu, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 203 days.

(21) Appl. No.: 10/337,898

(22) Filed: Jan. 8, 2003

(65) Prior Publication Data

US 2003/0132724 A1 Jul. 17, 2003

(30) Foreign Application Priority Data

Jan. 16, 2002 (JP) ........................................ 2002-006991

(51) Int. Cl.[7] ............................ H02K 16/00; H02P 7/67
(52) U.S. Cl. ...................................... 310/114; 310/184
(58) Field of Search ............................... 310/112, 114, 310/180, 184, 185, 195, 198; 318/495–496

(56) References Cited

U.S. PATENT DOCUMENTS

| 5,254,894 | A | * | 10/1993 | Satake et al. ............... 310/114 |
| 6,049,152 | A | * | 4/2000 | Nakano ........................ 310/114 |
| 6,201,331 | B1 | * | 3/2001 | Nakano ........................ 310/114 |
| 6,335,606 | B1 | * | 1/2002 | Minagawa et al. ......... 318/801 |
| 6,376,955 | B1 | | 4/2002 | Arimitsu |
| 6,429,562 | B2 | * | 8/2002 | Nakano et al. .............. 310/113 |
| 6,472,845 | B2 | * | 10/2002 | Minagawa et al. ......... 318/801 |
| 2001/0020805 | A1 | * | 9/2001 | Nakano et al. .............. 310/112 |

FOREIGN PATENT DOCUMENTS

| JP | 8-340663 A | 12/1996 |
| JP | 11-275826 A | 10/1999 |
| JP | 11-356015 A | 12/1999 |
| JP | 2001-231227 A | 8/2001 |

OTHER PUBLICATIONS

U.S. Appl. No. 10/361,559, filed Feb. 11, 2003, Arimitsu.

* cited by examiner

Primary Examiner—Burton Mullins
(74) Attorney, Agent, or Firm—Foley & Lardner LLP

(57) ABSTRACT

In a method of connecting an electric rotating machine, a second predetermined number of feeders on each of which a total sum of a current flow is zeroed is selected when the second predetermined number of the feeders are interconnected at a neutral point by a third predetermined number of groups from among a first predetermined number of the feeders and each coil of the rotating machine is connected between a corresponding one of the first predetermined number of the feeders and a corresponding one of the second predetermined number of the feeders for each of the third predetermined number of the groups, a product between the second predetermined number and the third predetermined number corresponding to that between a number of current phases in the compound current for driving a corresponding one of rotors and a number of pole pairs of the corresponding one of the rotors.

12 Claims, 10 Drawing Sheets

6-PHASE INNER ROTOR 2 POLE PAIRS

FIG.1C

3-PHASE OUTER ROTOR 4 POLE PAIRS

FIG.7

ELECTRIC ROTATING MACHINE AND ITS CONNECTING METHOD

BACKGROUND OF THE INVENTION

1. Field of the Invention

The present invention relates to an electric rotating machine and its (coil) connecting method thereof.

2. Description of the Related Art

A Japanese Patent Application First Publication No. Heisei 11-356015 published on Dec. 24, 1999 exemplifies a previously proposed rotating machine. The previously proposed rotating machine described in the above-described Japanese Patent Application First Publication adopts a three-layer structure of two rotors and a single stator. When a compound current is caused to flow through the rotating machine, a torque developed on one of the rotors can be non-interfered against that developed on the other rotor. The compound current can be realized by adding currents having two different frequencies or having two different phases. At the same time, in the same manner as the compound current, a synthesized voltage like a compound voltage needs to be generated having the two different frequencies or having the two different phases.

A Japanese Patent Application First Publication No. 2001-231227 published on Aug. 24, 2001 (which corresponds to a U.S. patent application Publication No. 2001/0020805 A1 published on Sep. 13, 2001) exemplifies a previously proposed compound motor having stator coils and rotors respectively independently operated of each pair of stator coils and rotors. In the latter previously proposed compound motor, an ineffective current in a case where the coils of the same polarities at two stator coils are connected in parallel to each other is controlled so as to improve an entire efficiency.

SUMMARY OF THE INVENTION

The following problem occurs in a technique disclosed in the former Japanese Patent Application First Publication No. Heisei 11-356015 since all stator coils are interconnected at a single neutral point. First, suppose that a DC link voltage is Vdc. A maximum voltage between terminals of the compound voltage gives Vdc. Then, a voltage to develop each current component cannot largely be taken, in order to divide the above-described maximum voltage into current components related to the two rotors.

Therefore, an effective power developed on each rotor becomes small for a capacity of a power supply in which the compound current is developed. Next, in a case where, due to a multiphase power supply to supply the compound current, in the compound motor, there is a combination of some currents in a case where phases of the currents in feeders are mutually different by 180 [el. deg] (electric angle which is a mechanical phase multiplied by a p number of pole pairs (for example, if p=2 and the mechanical angle is 180°, electric angle is 360°). In this case, even if an line voltage control is used, an utilization rate of the DC link voltage is low.

In addition, in the previously proposed compound motor disclosed in the latter Japanese Patent Application First Publication No. 2001-231227, from among the plurality of rotors, a current having a phase having a correlation to one of the rotors is caused to flow through coils of the one rotor but another current having the other party rotor has the same phase as no-current flow phase is collected as a single neutral point. Hence, the following problem occurs. Since a potential at the neutral point is determined to cause to flow a current having a correlation to the other party rotor, it is extremely difficult to simultaneously raise a voltage effective utilization rate on the two voltage components for the two rotors. Next, there are limitations in the number of slots of the stator and in the number of pole pairs of the respective rotors.

It is, therefore, an object of the present invention to provide an electric rotating machine and its coil connecting method thereof which are enabled to raise the utilization rate of the DC link voltage by distributing the neutral points.

According to one aspect of the present invention, there is provided a connecting method of an electric rotating machine a method of connecting an electric rotating machine, the rotating machine comprising a plurality of rotors driven by means of a compound current and a power supply supplying the compound current to the rotating machine via a first predetermined number of feeders, the method comprising: selecting a second predetermined number of the feeders on each of which a total sum of a current flow is zeroed when the second predetermined number of the feeders are interconnected at a neutral point by a third predetermined number of groups from among the first predetermined number of the feeders; and connecting each coil of the rotating machine between a corresponding one of the first predetermined number of the feeders and a corresponding one of the second predetermined number of the feeders for each of the third predetermined number of the groups, a product between the second predetermined number and the third predetermined number corresponds to that between a number of current phases in the compound current for driving a corresponding one of the rotors and a number of pole pairs of the corresponding one of the rotors.

According to another aspect of the present invention, there is provided a method of connecting an electric rotating machine, the rotating machine comprising a single rotor driven by a symmetrical N-phase alternating current (N denotes an arbitrary number) having a single frequency and a power supply supplying the symmetrical N-phase alternating current to the rotating machine via a first predetermined number of feeders, the method comprising: selecting a second predetermined number of the feeders on each of which a total sum of a current flow is zeroed when the second predetermined number of the feeders are interconnected at a neutral point by a third predetermined number of groups from among the first predetermined number of the feeders; and connecting each coil of the rotating machine between a corresponding one of the first predetermined number of the feeders and a corresponding one of the second predetermined number of the feeders for each of the third predetermined number of the groups, a product between the second predetermined number and the third predetermined number corresponds to that between a number of current phases in the compound current for driving of the rotor and a number of pole pairs of the rotor.

According to a further aspect of the present invention, there is provided an electric rotating machine comprising: a plurality of rotors driven by means of a compound current; a power supply supplying the compound current to the rotating machine via a first predetermined number of feeders; a selecting section that selects a second predetermined number of the feeders on each of which a total sum of a current flow is zeroed when the second predetermined number of the feeders are interconnected at a neutral point by a third predetermined number of groups from among the first predetermined number of the feeders; and a connecting section that connects each coil of the rotating machine between a corresponding one of the first predetermined number of the feeders and a corresponding one of the second predetermined number of the feeders for each of the third predetermined number of the groups, a product between the second predetermined number and the third predetermined number corresponds to that between a number of current phases in the compound current for driving a corresponding one of the rotors and a number of pole pairs of the corresponding one of the rotors.

According to a still further aspect of the present invention, there is provided an electric rotating machine a single rotor driven by a symmetrical N-phase alternating current (N denotes an arbitrary number) having a single frequency; a power supply supplying the symmetrical N-phase alternating current to the rotating machine via a first predetermined number of feeders; a selecting section that selects a second predetermined number of the feeders on each of which a total sum of a current flow is zeroed when the second predetermined number of the feeders are interconnected at a neutral point by a third predetermined number of groups from among the first predetermined number of the feeders; and a connecting section that connects each coil of the rotating machine between a corresponding one of the first predetermined number of the feeders and a corresponding one of the second predetermined number of the feeders for each of the third predetermined number of the groups, a product between the second predetermined number and the third predetermined number corresponds to that between a number of current phases in the compound current for driving of the rotor and a number of pole pairs of the rotor.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Before explaining the present invention, a comparative example to a method of connecting an electric rotating machine will be described below with reference to FIGS. 1A through 1C and FIG. 2.

Figure 1A:
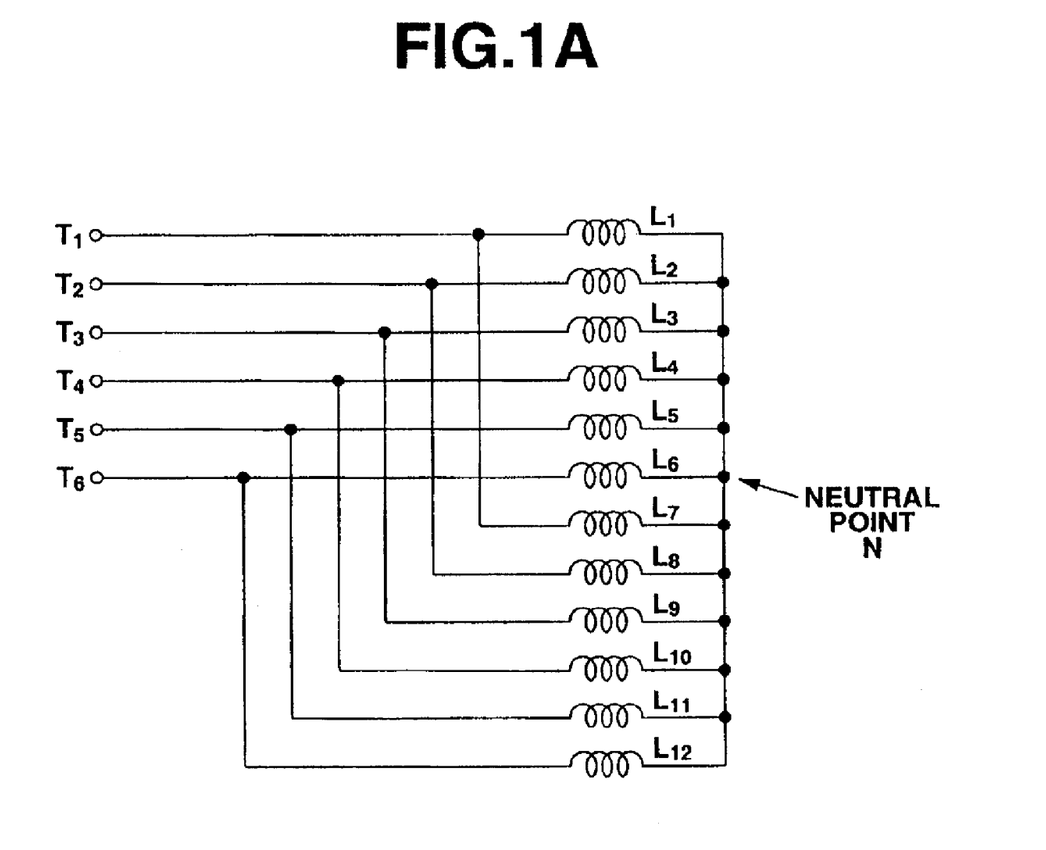
FIG. 1A is a connection diagram of a connecting method of an electric rotating machine as a comparative example to a first preferred embodiment of a connecting method of the electric rotating machine.

FIG. 1A shows a wiring diagram of the comparative example of the method of connecting the rotating machine constituted by a compound motor to which the number of slots of its stator are 12, an inner rotor two pole pairs with a six-phase drive, and an outer rotor four pole pairs with a three-phase drive, the compound motor corresponding to that described in the Japanese Patent Application First Publication No. Heisei 11-356015 published on Dec. 24, 1999.

Figure 1B:
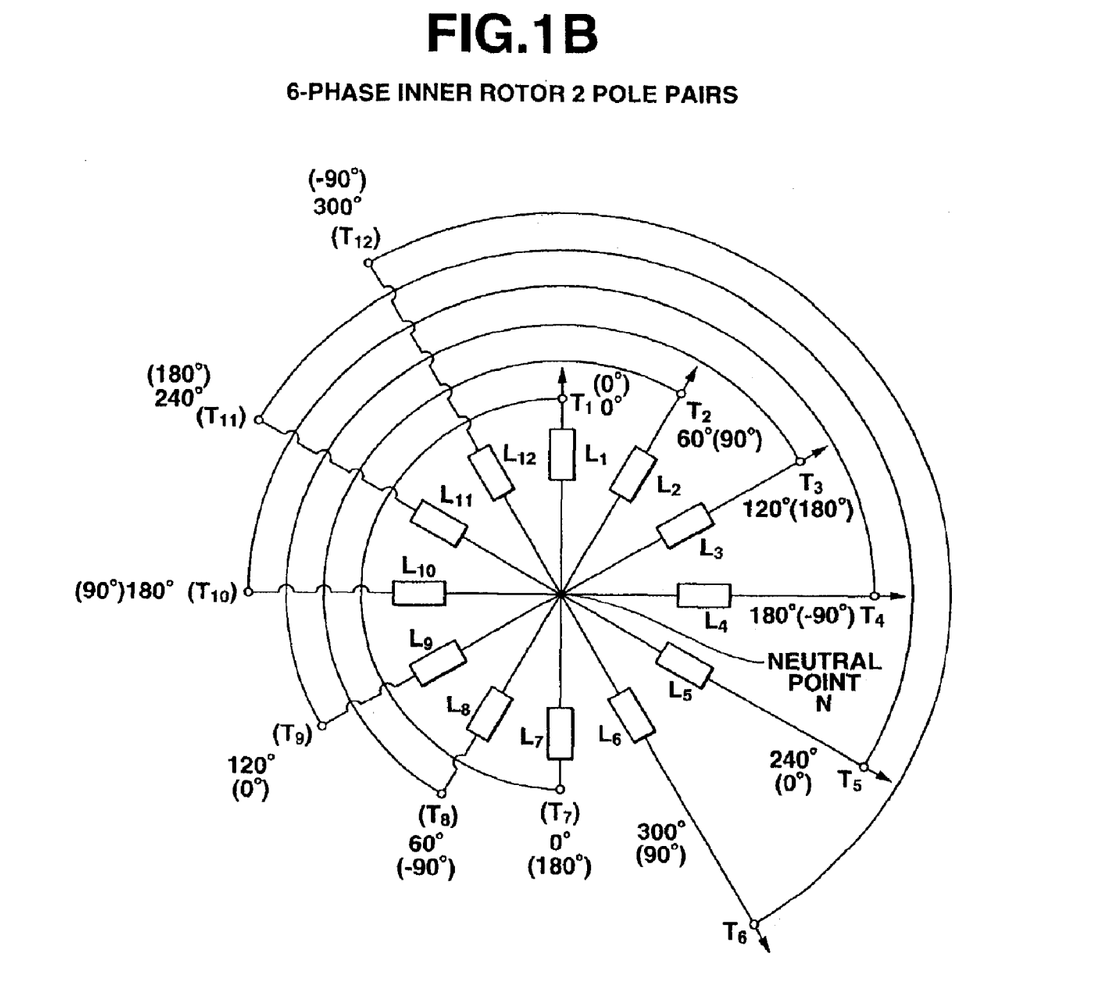
FIG. 1B is a wiring diagram of the connecting method of the electric rotating machine as the comparative example shown in FIG. 1A.

FIG. 1A simply shows parts of feeder connections to twelve coils $L_1$ through $L_{12}$, each coil $L_1$ through $L_{12}$ being wound on a corresponding one of twelve stator slots of the compound motor described above. FIG. 1B shows a connection diagram of the 6-phase inner rotor 2 pole pair drive circuit shown in FIG. 1A. In this example, in order to cause the same current to flow through each pair of coils, a first coil $L_1$ and a seventh coil $L_7$, a second coil $L_2$ and an eighth coil $L_8$, a third coil $L_3$ and a ninth coil $L_9$, a fourth coil $L_4$ and a tenth coil $L_{10}$, a fifth coil $L_5$ and an eleventh coil $L_{11}$, and a sixth coil $L_6$ and a twelfth coil $L_{12}$, one end (leftward in FIG. 1A) end of each of first through sixth coils $L_1$ through $L_6$ is interconnected to one end (leftward in FIG. 1A) of each of seventh through twelfth coils $L_7$ through $L_{12}$ sequentially since each junction point has the same voltage. A first terminal $T_1$ is connected to a first junction between the first and seventh coils $L_1$ and $L_7$. A second terminal $T_2$ is connected to a second junction between the second and eighth coils $L_2$ and $L_8$. A third terminal $T_3$ is connected to a third junction between the third and ninth coils $L_3$ and $L_9$. A fourth terminal $T_4$ is connected to a fourth junction between the fourth and tenth coils $L_4$ and $L_{10}$. A fifth terminal $T_5$ is connected to the fifth and eleventh coils $L_5$ and $L_{11}$. A sixth terminal $T_6$ is connected to the sixth and twelfth coils $L_6$ and $L_{12}$. It is noted that the other ends (rightward in FIG. 1A) of the respective coils $L_1$ through $L_{12}$ are at the same potential and are interconnected at a single neutral point N. The neutral point N provides a zero-current total sum. It is noted that the following voltages are applied through the above-described first through sixth terminals $T_1$ through $T_6$.

$$\text{Terminal } T_1: V_{IN} \times \sin(\theta\text{in} - 0) + V_{OUT}(\theta\text{out} - 0). \quad (1)$$

$$\text{Terminal } T_2: V_{IN} \times \sin(\theta\text{in} - 60) + V_{OUT} \times \sin(\theta\text{out} - 120). \quad (2)$$

$$\text{Terminal } T_3: V_{IN} \times \sin(\theta\text{in} - 120) + V_{OUT} \times \sin(\theta\text{out} - 240). \quad (3)$$

$$\text{Terminal } T_4: V_{IN} \times \sin(\theta\text{in} - 180) + V_{OUT} \times \sin(\theta\text{out} - 0). \quad (4)$$

-continued

Terminal $T_5: V_{IN} \times \sin(\theta\text{in} - 240) + V_{OUT} \times \sin(\theta_{OUT} - 120)$. (5)

Terminal $T_6: V_{IN} \times \sin(\theta\text{in} - 300) + V_{OUT} \times \sin(\theta\text{out} - 240)$. (6)

It is noted that $V_{IN}$ denotes a voltage amplitude value to cause the current to flow through an inner rotor (as will be described later) to develop a torque thereat, $V_{OUT}$ denotes the voltage amplitude value to cause the flow of the current to develop the torque on the inner rotor, and θin denotes a rotational angle of the inner rotor, and $\theta_{OUT}$ denotes a rotational angle of an outer rotor (as will be described later). That is to say, each first term of equations (1) through (6) is a voltage value (6-phase alternating current) to cause the current to flow through the corresponding stator coils so as to generate the torque on the inner rotor. A second term of each of these equations (1) through (6) is a voltage value (3-phase alternating current) to cause the current to flow through the corresponding stator coils so as to generate the torque on the outer rotor.

Figure 2:
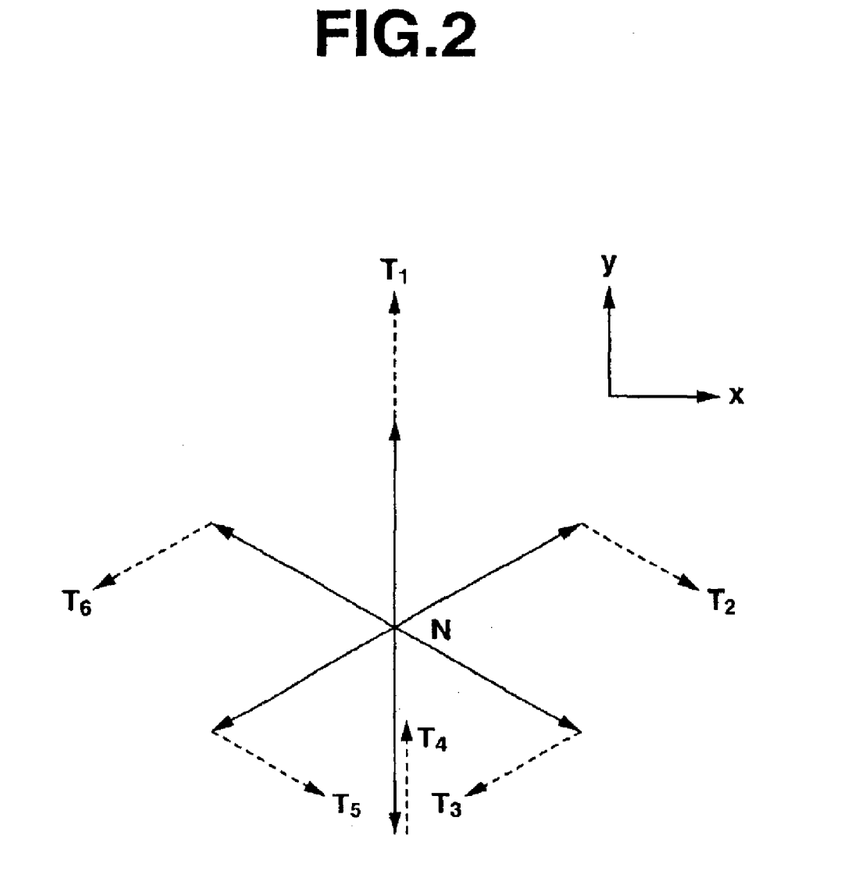
FIG. 2 is a diagram of a voltage phaser at each terminal in the connection method shown in FIGS. 1A and 1B.

It is noted that if equations (1) through (6) are described as phasers, an arrow mark denoted in a solid line form as shown in FIG. 2 expresses an effective voltage phaser to the torque of the inner rotor and that denoted in a dot line as shown in FIG. 2 expresses an effective voltage phaser to the torque of the outer rotor. A tip of the arrow mark denoted in the dot line form in FIG. 2 represents a potential of each terminal. Since N shown in FIG. 2 denotes a potential at neutral point N and indefinite, any value can be taken if only a voltage between the terminals is determined. Hence, the line voltage control is carried out and the drive at a relatively low voltage is desired to be carried out.

In order to obtain a maximum voltage amplitude under a given predetermined DC voltage, a longest distance of the arrow marks top portions of the instantaneous voltage phasers with respect to each terminal may be searched. At this time, the potential determined according to the following equation may be subtracted from the potential at each terminal.

$$N = (\max(\text{first terminal } T_1, ---, \text{sixth terminal } T_6) + \min(\text{first terminal } T_1, ---, \text{sixth terminal } T_6))/2. \quad (7)$$

With equation (7) divided into the inner rotor (6-phase) and the outer rotor (3-phase) as described below, equation (7) can be evolved.

$$N = (\max(3 \text{ phase of first terminal } T_1, ---, 3 \text{ phase of sixth terminal } T_6) + \min(3 \text{ phase of first terminal } T_1, ---,$$
$$3 \text{ phase of sixth terminal } T_6))/2 +$$
$$(\max(6 \text{ phase of first terminal } T_1, ---,$$
$$6 \text{ phase of sixth terminal } T_6) +$$
$$\min(6 \text{ phase of first terminal } T_1, ---,$$
$$---, 6 \text{ phase of sixth terminal } T_6)/2 ---. \quad (8)$$

It is noted that a second term of equation (8) means 6 phase voltage components of the inner rotor. As appreciated from FIG. 2, in the case of 6-phase drive, each phase at first and fourth terminals $T_1$ and $T_4$, that at second and fifth terminals $T_2$ and $T_5$, and that at third and sixth terminals $T_3$ and $T_6$ are mutually different by 180 [el. deg] and a sum of a maximum value and a minimum value at an arbitrary instantaneous time (for example, in the case of FIG. 2, the phases at first and fourth terminals $T_1$ and $T_4$) indicates zero. If DC voltage is Vdc, only amplitude of Vdc/2 can be taken during an outer rotor stop at a maximum torque even if N is added to equations (1) through (6) regardless of which value of N is taken.

As described above, in the comparative example shown in FIGS. 1A through 1C and FIG. 2, the line voltage control is effective only for the outer rotor under the three-phase drive but the voltage cannot effectively be utilized according to the line voltage control for the six-phase drive inner rotor of the compound motor described in the above-described Japanese Patent Application First Publication No. Heisei 11-356015.

Hereinafter, a first preferred embodiment of the connecting method for the electric rotating machine will be described below with reference to FIGS. 3A through 6.

Figure 3A:
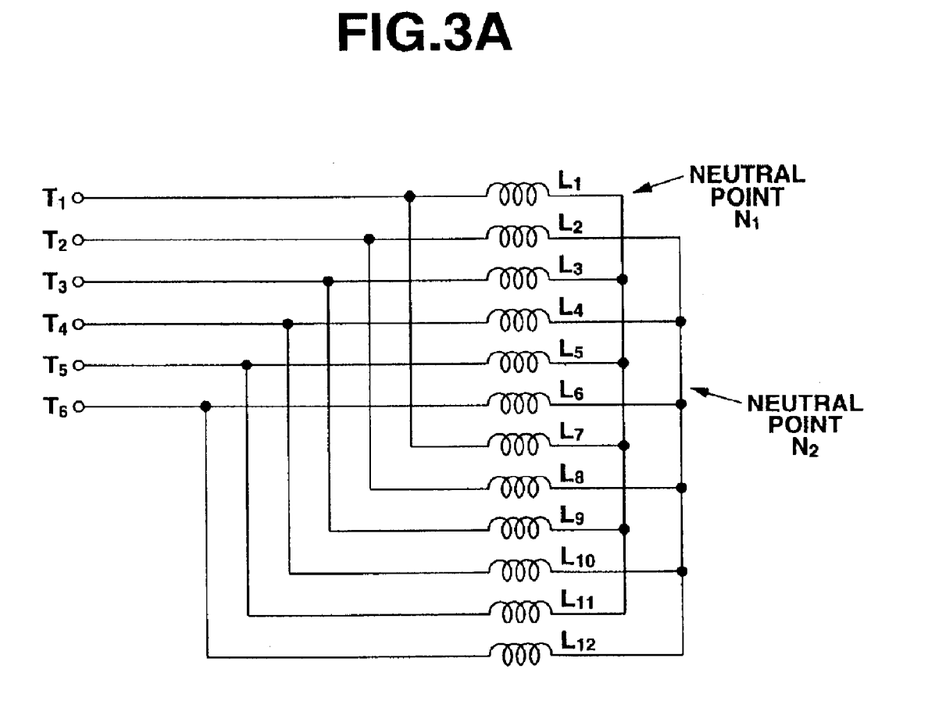
FIG. 3A is a connection diagram of stator coils of the electric rotating machine in the first preferred embodiment according to the present invention.
Figure 3B:
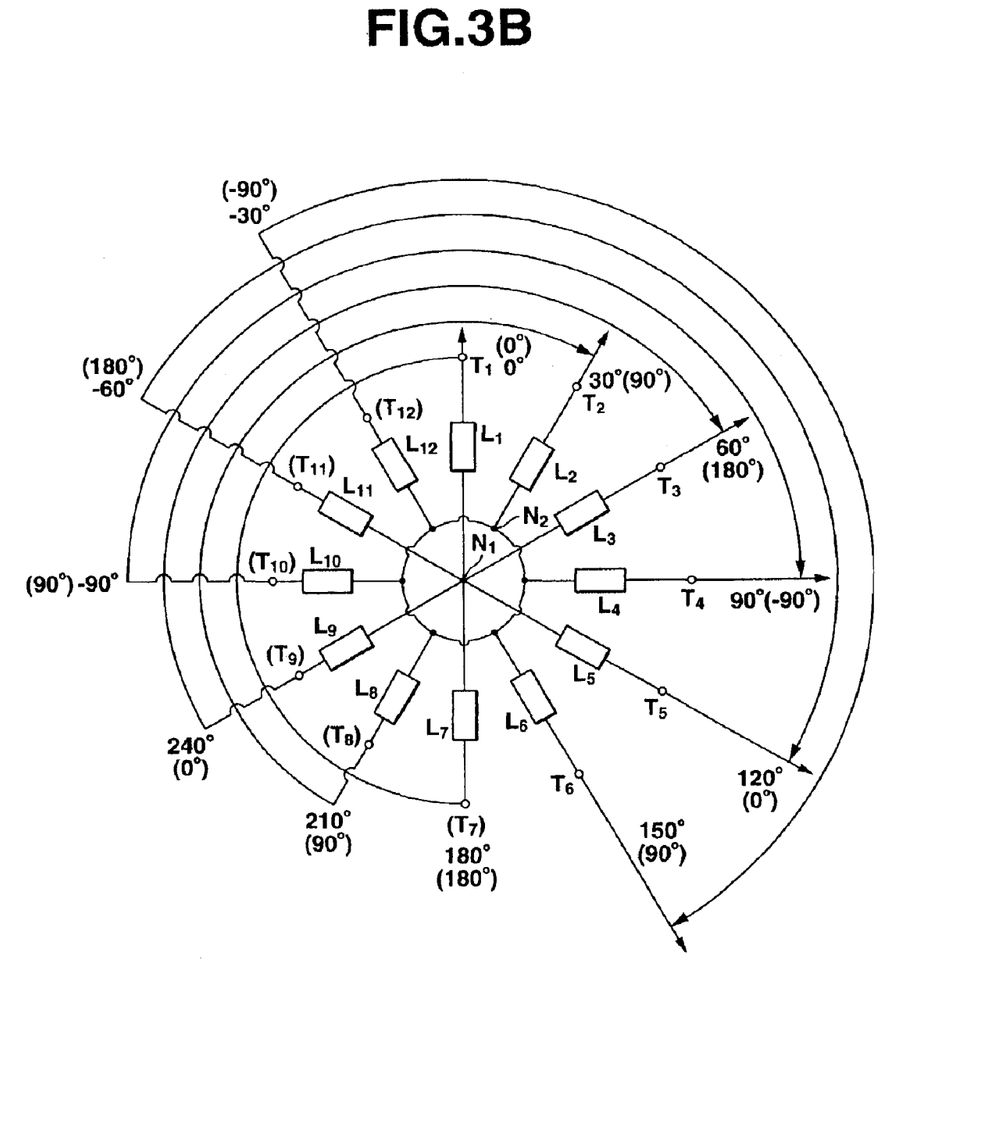
FIG. 3B is a wiring diagram of the connecting method of electric rotating machine shown in FIG. 3A.

FIG. 3A shows a wiring diagram of stator coils for the inner rotor two pole pairs with the 3-phase drive of the compound motor as the electric rotating machine and FIG. 3B shows a connection diagram of the stator coils. In FIG. 3A, the first preferred embodiment of the method of connecting the electric rotating machine constituted by the compound motor to which the number of the stator slots are twelve, 6-phase drive with inner rotor 2 pole pairs, and 3-phase drive with outer rotor 4 pole pairs are applicable.

Figure 5A:
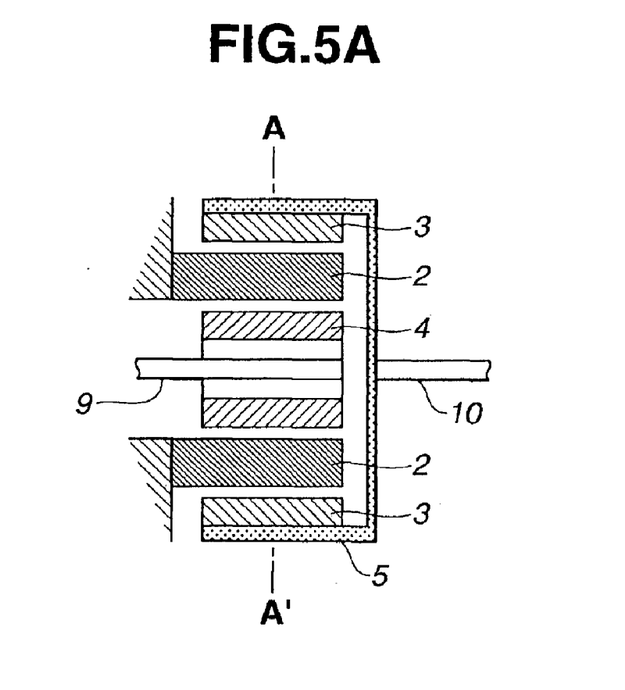
FIG. 5A is a cross sectional view of the compound motor shown in FIG. 4B.
Figure 5B:
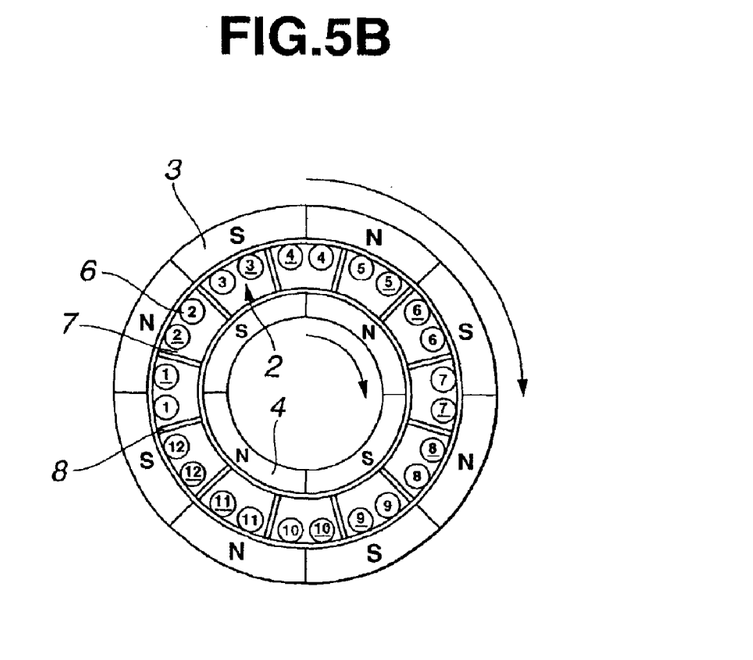
FIG. 5B is a cross sectional view of the compound motor cut away along a line A to A'.

It is noted that the compound motor to which the present invention is applicable is shown in FIGS. 5A and 5B. That is to say, FIG. 5A shows a cross sectional view of the compound motor and FIG. 5B shows a cross sectional view cut away along a line of A to A' shown in FIG. 5A. The compound motor, in this embodiment, includes: a hollow cylindrical shaped stator 2: an inner rotor 4 provided on an inner peripheral end of stator 2 with a predetermined gap; an outer rotor 3 provided on an outer peripheral end of the stator with the predetermined gap. This compound motor is of the three-layer structure. In addition, an inner rotor shaft 9 is mounted so as to be on the same axle as an outer rotor shaft 10. Both inner rotor 4 and outer rotor 3 can be revolved independently of each other on the same axle. It is noted that a bearing for each rotor will herein be omitted in FIGS. 5A and 5B. Inner rotor 4 is formed of two pairs of permanent magnets of two N (North) poles and two S (South) poles disposed alternatively, namely, two pole pairs. Outer rotor 3 is formed of four pairs of permanent magnets of four N poles and four S poles disposed alternatively, namely, four pole pairs. A rotating force of outer rotor 3 is not given by inner rotor 4 and that of inter rotor 4 is not given by the outer rotor 3. The coils of stator 2 are constituted by 1×½ (3/2) coils 6 per magnetic pole of outer rotor 3 and a total of 3/2×8=12 coils 6 are arranged at equal intervals of the same circumference of stator 2. A numeral enclosed by a circle denotes a winding of each coil. For example, numerals 1 and 1 constitute a single coil 6 and directions of the current are reversed. That is to say, 1 denotes a winding arranged in such a way that the current is caused to flow toward a sheet surface direction and 1 denotes a winding surface arranged such that the current is caused to flow toward an anti-sheet surface (opposite to the sheet surface direction). In this stator coils shown in FIGS. 5A and 5B, a method of winding is a concentrated winding.

In addition, numeral 7 shown in FIG. 5B denotes each core on which the corresponding coil 6 is wound. The same number of cores 7 is arranged equally at a predetermined gap 8 on a circumference of stator 2. In these twelve coils, each coil on the corresponding core 7, the following compound currents $I_1$ through $I_{12}$ are caused to flow through twelve coils of stator 2. First, in order to cause a current (six-phase current) to develop rotating magnetic fields for inner rotor 4, 60° phase deviated currents $I_d$, $I_f$, and $I_e$ are set on three couples of coils denoted by [1, 7]=[7, 1], [3,9]=[9,3], and [5, 11]=[11, 5]. In addition, 60° phase deviated currents $I_d$, $I_f$, and $I_e$ are set on the remaining three couples denoted by [2, 8]=[8, 2], [4, 10]=[10, 4], and [6, 12]=[12, 6] with 30° phase deviated from the above-described three couples. It is noted that each underline attached below the corresponding numeral denotes the reverse current flow direction. For example, causing the current $I_d$ to flow through one couple of coils [1, 7]=[7, 1] means that one half of current $I_d$ is caused to flow from coil winding 1 to coil winding 7 and the other half of current $I_d$ is caused to flow from coil winding 7 to coil winding 1. Since coil windings 1 and 1 and those 7 and 7 are mutually the same positions of stator 2, these current supplies can generate rotating magnetic fields of the same number as that of magnetic poles (four poles) of inner rotor 4. Next, in order to cause a current (three-phase current) to develop the rotating magnetic fields for outer rotor 3, 120° phase deviated currents $I_a$, $I_c$, and $I_b$ are set on three couples of coils of [1]=[4]=[7]=[10], [2]=[5]=[8]=[11], and [3]=[6]=[9]=[12]. For example, current flow $I_a$ through one couple of [1]=[4]=[7]=[10] means that current flow $I_a$ is caused to flow from coil windings 1 to 4 and is caused to flow from coil windings 7 to 10. Since coil windings 1 and 7 and coil windings 4 and 10 are placed at mutually 180° opposite positions of stator 2, these current supplies $I_a$, $I_c$, and $I_b$ can develop the same number of rotating fields as the pile number of outer rotor 3. Consequently, the following respective compound currents $I_1$ through $I_{12}$ are caused to flow through twelve coils $L_1$ through $L_{12}$.

$$I_1 = (1/2) \cdot I_d + I_a$$

$$I_2 = (1/2) \cdot I_d + I_c$$

$$I_3 = (1/2) \cdot I_f + I_b$$

$$I_4 = (1/2) \cdot I_f + I_a$$

$$I_5 = (1/2) \cdot I_e + I_c$$

$$I_6 = (1/2) \cdot I_e + I_b$$

$$I_7 = (1/2) \cdot I_d + I_a$$

$$I_8 = (1/2) \cdot I_d + I_c$$

$$I_9 = (1/2) \cdot I_f + I_b$$

$$I_{10} = (1/2) \cdot I_f + I_a$$

$$I_{11} = (1/2) \cdot I_e + I_c$$

$$I_{12} = (1/2) \cdot I_e + I_b$$

It is noted that each underline attached below the corresponding current symbol described above represents the reverse current flow direction and coil windings 1 and 1 shown in FIG. 5B correspond to first coil $L_1$, those 2 and 2 corresponds to second coil $L_2$, those 3 and 3 correspond to third coil $L_3$, those 4 and 4 correspond to fourth coil $L_4$, those 5 and 5 correspond to fifth coil $L_5$, those 6 and 6 correspond to sixth coil $L_6$, those 7 and 7 correspond to seventh coil $L_7$, 8 and 8 correspond to eighth coil $L_8$, those 9 and 9 correspond to ninth coil $L_9$, those 10 and 10 correspond to tenth coil $L_{10}$, those 11 and 11 correspond to eleventh coil $L_{11}$, and those 12 and 12 correspond to twelfth coil $L_{12}$.

Figure 4A:
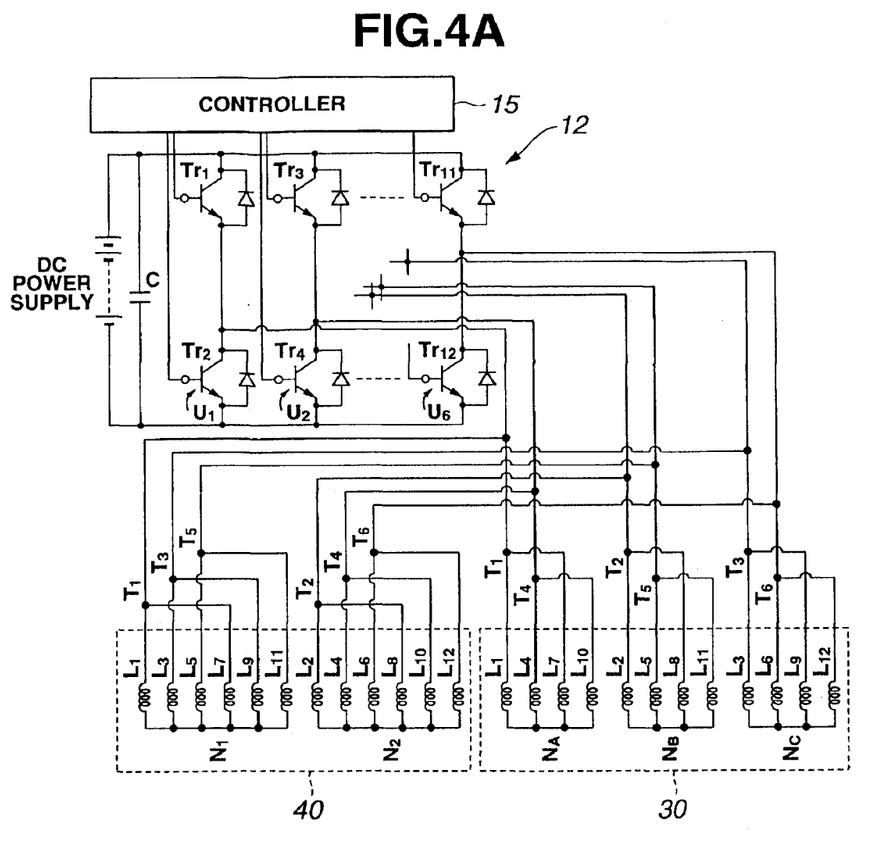
FIG. 4A is a whole circuit block diagram of a rotation control system of the electric rotating machine.

In FIG. 3B, in these twelve coils, the compound currents are caused to flow through twelve coils $L_1$ through $L_{12}$ in such a way that sixth-phase currents are caused to flow through first through twelfth coils $L_1$ through $L_{12}$ via first through sixth terminals $T_1$ through $T_6$. It is noted that, in the same way as shown in FIG. 1B, since first terminal $T_1$ is connected to seventh terminal $T_7$, second terminal $T_2$ to eighth terminal $T_8$, third terminal $T_3$ to ninth terminal $T_9$, fourth terminal $T_4$ to tenth terminal $T_{10}$, fifth terminal $T_5$ to eleventh terminal $T_{11}$, and sixth terminal $T_6$ to twelfth terminal $T_{12}$, two symmetrical six-phase currents are caused in the compound current form to flow through first through twelfth coils $L_1$ through $L_{12}$. In details, for example, 0° phase current is caused to flow through first coil $L_1$ via first terminal $T_1$. 30° phase deviated current is caused to flow through second coil $L_2$ via second terminal $T_2$. 60° phase deviated current is caused to flow through third coil $L_3$ via third terminal $T_3$, 90° phase deviated current is caused to flow through fourth coil $L_4$ via fourth terminal $T_4$, 120° phase deviated current is caused to flow through fifth coil $L_5$ via fifth terminal $T_5$, 150° phase deviated current is caused to flow through sixth coil $L_6$ via sixth terminal $T_6$, 180° phase deviated current is caused to flow through seventh coil $L_7$ via seventh terminal $T_7$, 210° phase deviated current is caused to flow through eighth coil $L_8$ via an eighth terminal $T_8$, 240° phase deviated current is caused to flow through ninth coil $L_9$ via a ninth terminal $T_9$, 270° (−90°) phase deviated current is caused to flow through tenth coil $L_{10}$ via a tenth terminal $T_{10}$, 300° (−60°) phase deviated current is caused to flow through eleventh coil $L_{11}$ via an eleventh terminal $T_{11}$, and 330° (−30°) phase deviated current is caused to flow through twelfth coil $L_{12}$ via twelfth terminal $T_{12}$, respectively. Thus, with first neutral point $N_1$ as a center, a symmetrical six-phase current is caused to flow through first, third, fifth, seventh, ninth, and eleventh coils $L_1$, $L_3$, $L_5$, $L_7$, $L_9$, and $L_{11}$, each phase difference being 60° and, with second neutral point $N_2$ as a center, another symmetrical six-phase current is caused to flow through the remaining coils $L_2$, $L_4$, $L_6$, $L_8$, and $L_{12}$, respectively. Hence, six-phase rotating magnetic fields for outer rotor 4 are formed. Thus, by connecting first through twelfth coils $L_1$ through $L_{12}$ as shown in FIG. 3B, two pole pair inner rotor six-phase driver circuit 40 as shown in FIG. 4A is formed. It is noted that since the other party phase is 0° (as enclosed by brackets shown in FIG. 3B) when 0° phase current is caused to flow through first coil $L_1$ via first terminal $T_1$, the other party phase is 0° when 120° phase deviated current is caused to flow through fifth coil $L_5$ via fifth terminal $T_5$, and 240° phase current is caused to flow through ninth coil $L_9$ via ninth terminal $T_9$, namely, since the same phase of 0° are indicated at the coils forming the symmetrical three-phase current, no three-phase current flows through coils $L_1$, $L_5$, and $L_9$ constituting the opposing two pole pair outer rotor three-phase drive circuit 30.

Figure 1C:
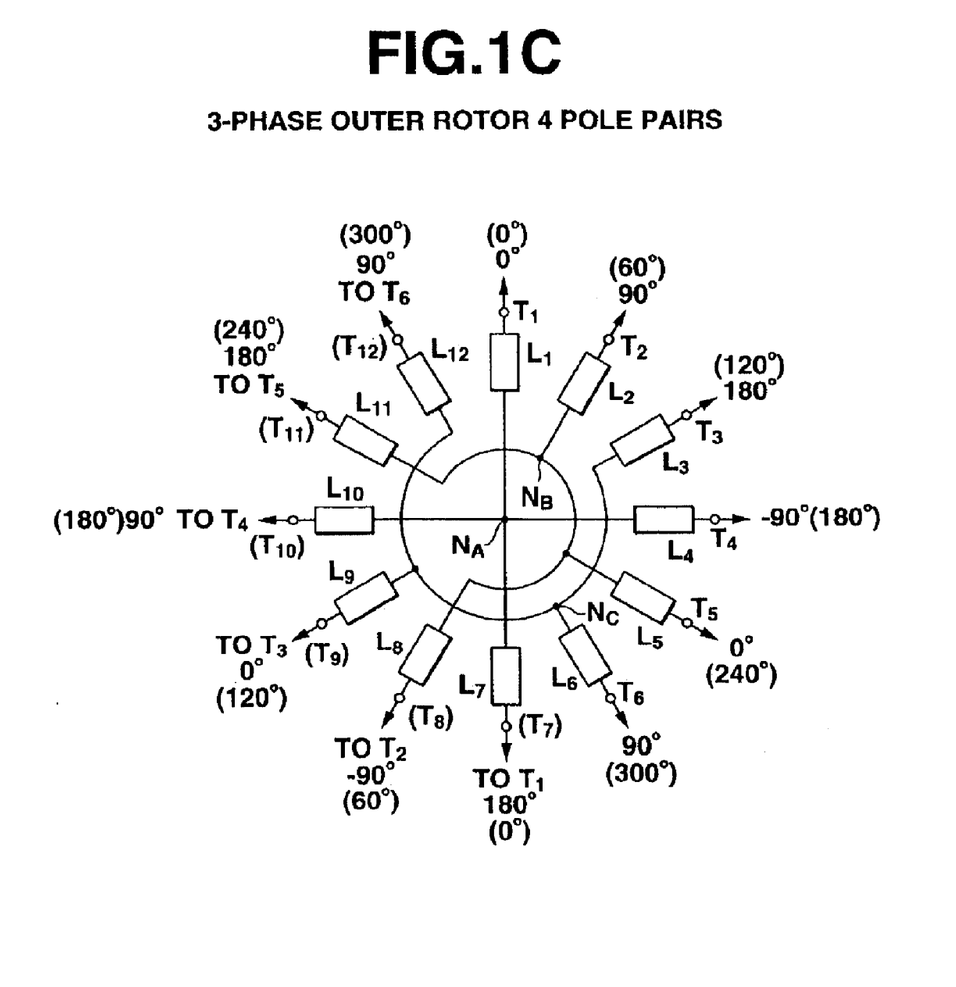
FIG. 1C is a wiring diagram of an example of a four pole pair outer rotor 3-phase drive circuit.
Figure 4B:
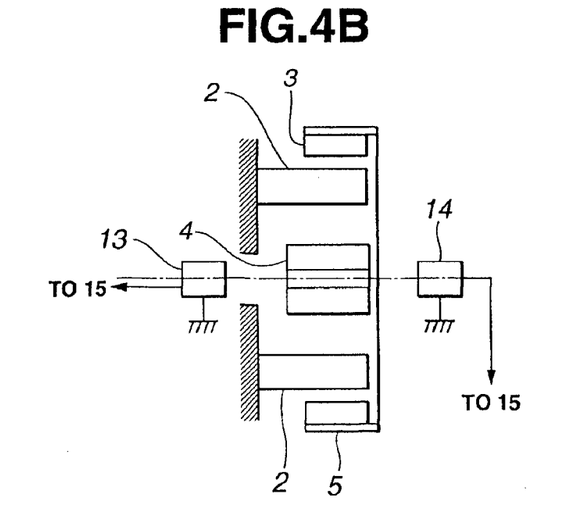
FIG. 4B is a block diagram of a three layer type compound motor as the electric rotating machine connected to the rotation control system shown in FIG. 4A.

On the other hand, as shown in FIG. 1C, when 0° phase current is caused to flow through first coil $L_1$ via first terminal $T_1$, −90° phase deviated current is caused to flow through fourth coil $L_4$ via a fourth terminal $T_4$, 180° phase deviated current is caused to flow through seventh coil $L_7$ via seventh terminal $T_7$, and −90° phase deviated current is caused to flow through tenth coil $L_{10}$ via tenth terminal $T_{10}$, no symmetrical six-phase current is caused to flow through first, third, fifth, seventh, ninth, and eleventh coils $L_1$, $L_3$, $L_5$, $L_7$, $L_9$, and $L_{11}$ since the neutral points are different. This can be applied equally well to any other cases where, for example, 90° phase deviated current flows through second coil $L_2$ via second terminal $T_2$, 0° phase deviated current is caused to flow through fifth coil $L_5$ via fifth terminal $T_5$, and −90° phase deviated current is caused to flow through eighth coil L$_8$ via eighth terminal T$_8$ as the symmetrical three-phase current. Hence, when the two pole pair inner rotor drive circuit 40 shown in FIG. 4A is active, the four pole pair outer rotor 30 shown in FIG. 4B is not active and vice versa. In other words, the torque developed by inner rotor 4 can independently be controlled from that of outer rotor 6.

First through sixth terminals T$_1$ through T$_6$ of two pole inner rotor six-phase drive circuit 30 and four pole outer rotor three-phase drive circuit 40 are connected to an inverter 12. Inverter 12 includes twelve transistors Tr1, Tr2, Tr3, Tr4, - - - Tr11, and Tr12. Each transistor Tr1 through Tr12 has a diode interposed between its collector and its emitter, first terminal T$_1$ is connected to a junction between first and second transistors Tr1 and Tr2, second terminal T$_2$ to that between third and fourth transistors Tr2 and Tr3, - - -, and sixth terminals T6 to that between eleventh and twelfth transistors Tr12. In FIGS. 4A and 4B, rotational angle sensors 13 and 14 for inner rotor 4 and outer rotor 3 are connected to a controller 15. Controller 15 outputs a PWM (Pulse Width Modulation) signal to each base of transistors Tr1 through Tr12 of inverter 12, for example, in accordance with input signals of respective rotational angle sensors 13 and 14. Rotational angle sensor 13 is attached onto inner rotor shaft 9 and outer rotor rotational angle sensor 14 is attached onto outer rotor shaft 10 via an outer casing 5, as shown in FIG. 5A. The first through sixth terminals T$_1$ through T$_6$ receive voltage expressed in equations (1) through (6) described above. In addition, in FIG. 4A, C denotes a capacitor connected across DC power supply.

In the same way as that shown in FIG. 1A, first through twelfth coils L$_1$ through L$_{12}$ and first through sixth terminals T$_1$ through T$_6$ are present for the six-phase inner rotor 2 pole pairs. The left end of first coil L$_1$ is connected to the same end of seventh coil L$_7$. The left end of seventh coil L$_2$ is connected to the end of eighth coil L$_8$. The left end of third coils L$_3$ is connected to that of ninth coil L$_9$. The left end of the fourth coil L$_4$ is connected to that of L$_{10}$. The left end of the fourth coil L$_4$ is connected to that of the tenth coil L$_{10}$. The left end of the fifth coil L$_5$ is connected to that of the eleventh coil L$_{11}$. The left end of the sixth coil L$_6$ is connected to that of the twelfth coil L$_{12}$. The voltage to be applied to each terminal T$_1$ through T$_6$ is represented by equations (1) through (6), respectively. A first coil group has first coil L$_1$, third coil L$_3$, fifth coil L$_5$, seventh coil L$_7$, ninth coil L$_9$, and eleventh coil L$_{11}$. A second coil group has second coil L$_2$, fourth coil L$_4$, and sixth coil L$_6$, eighth coil L$_8$, tenth coil L$_{10}$, and twelfth coil L$_{12}$. A total sum of the current flowing through each of the first and second groups is zeroed.

Hence, as shown in FIG. 3A, the right end of first coil L$_1$ is connected to that of third coil L$_3$, that of fifth coil L$_5$, that of seventh coil L$_7$, that of ninth coil L$_9$ and that of eleventh coil L$_{11}$, via a neutral point N$_1$ and the right end of second coils L$_2$, that of fourth coil L$_4$, that of sixth coil L$_6$, that of eighth coil L$_8$, that of tenth coil L$_{10}$, and that of twelfth coil L$_{12}$ via another neutral point N$_2$. No change in voltage and current occurs before and after the separation and connection of the neutral point from N to N$_1$ and N$_2$.

Figure 6:
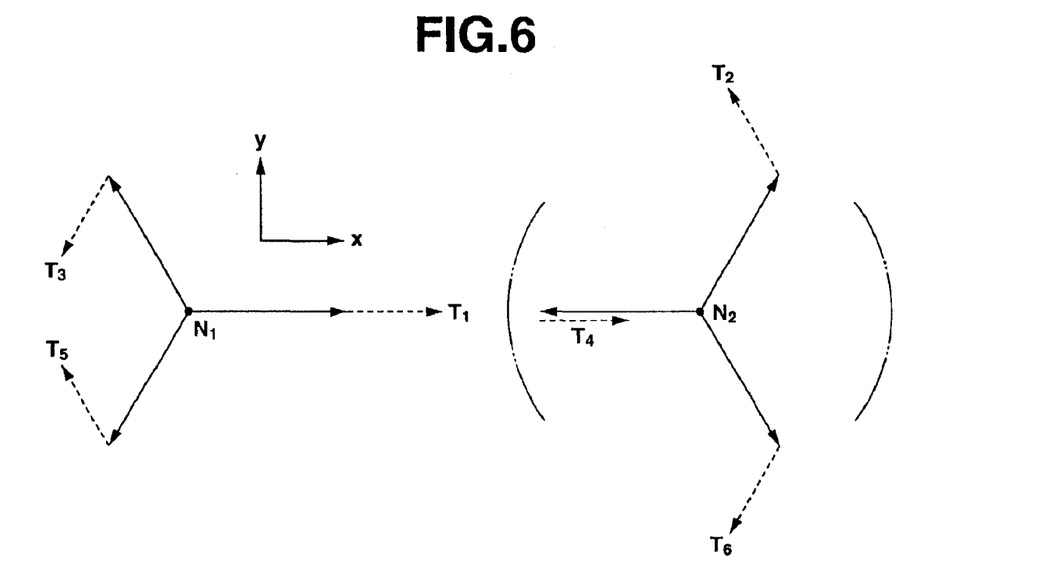
FIG. 6 is a diagram of another voltage phaser at each terminal of the connecting method shown in FIGS. 3A and 3B.

FIG. 6 shows the voltage phaser related to terminals T$_1$, T$_3$, and T$_5$. It is noted that, for terminals T$_2$, T$_4$, and T$_6$, the same phaser may be applied except that a phase rotation of the voltage phaser on the inner rotor is different.

In this case, potential N$_1$ to be subtracted from the potential at each terminal to carry out the line voltage control can be determined as follows: N$_1$=(max(terminal T$_1$, terminal T$_3$, terminal T$_5$)+min (terminal T$_1$, terminal T$_3$, terminal T$_5$))/2 - - - (9).

In the same manner as described above in the comparative example, above equation (9) can be expanded as follows:

N$_1$=(max(3 phase of terminal T$_1$, 3 phase of terminal T$_3$, 3 phase of terminal T$_5$)+min (3 phase of terminal T$_1$, 3 phase of terminal T$_3$, 3 phase of terminal T$_5$)/2+max(6 phase of terminal T$_1$, 6 phase of terminal T$_3$, 6 phase of terminal T$_5$)/2 - - - (10).

As appreciated from FIG. 6, there is no combination of the voltage and current which are different 180 [el. deg] out of phase in the case of three phase or six phase current. At every time, a second term of equation (10) indicates non-zero. Hence, it is possible to raise the voltage utilization rate by subtracting a value of N$_1$ described in equation (10) from the voltages expressed in equations (1) through (6).

Figure 5C:
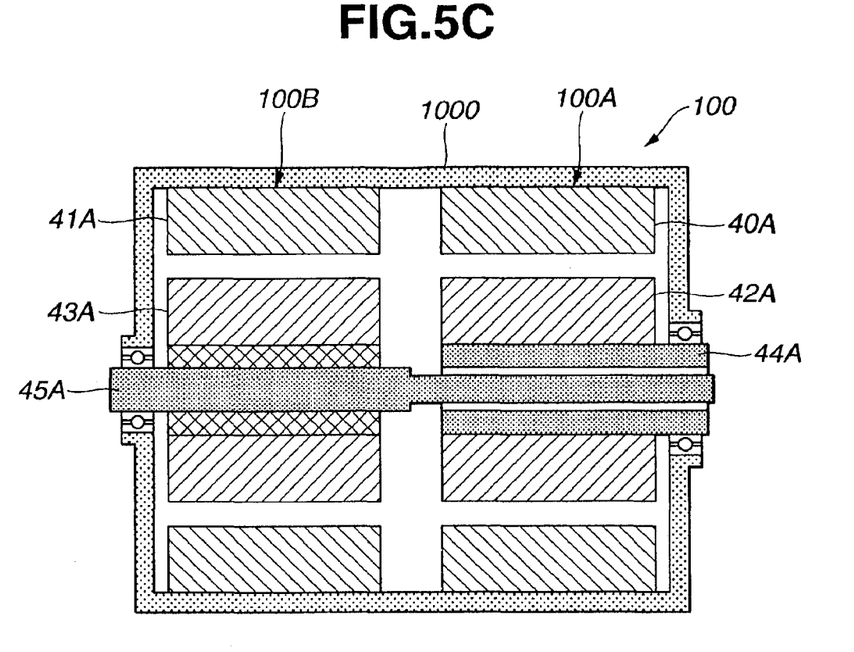
FIG. 5C is a cross sectional view of an example of a compound motor of a split-stator type applicable as a motor/generator.
Figure 5D:
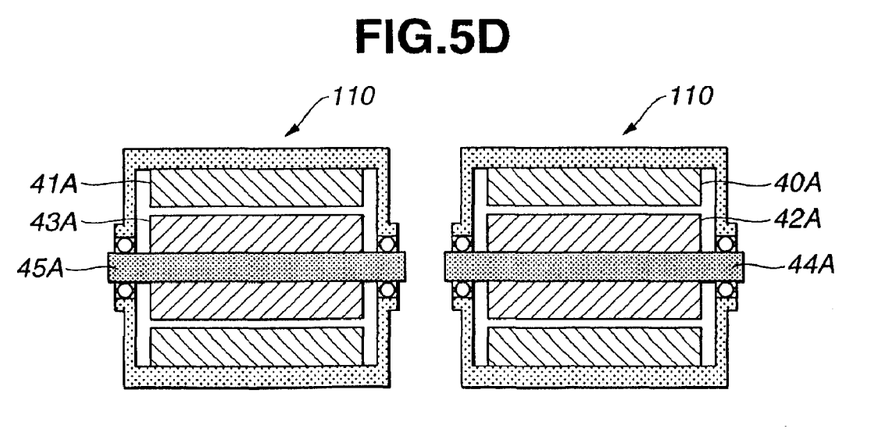
FIG. 5D is a cross sectional view of another example of the compound motor of a separation type applicable as motor/generator units.

It is noted that two pole pair inner rotor 6-phase drive circuit shown in FIG. 3B (or FIG. 3A) is applicable to twin rotor one stator compound motor drive circuit shown in FIGS. 4A and 4B and, in this embodiment, four pole pair outer rotor 3-phase drive circuit shown in FIG. 1C is applicable to a parallel circuit 30 to two pole pair inner rotor 6-phase drive circuit 40. However, two pole pair inner rotor 6-phase drive circuit shown in FIG. 3B (or FIGS. 3A or 4A) and four pole pair outer rotor 3-phase drive circuit shown in FIG. 1C (or FIG. 4A) is also applicable to a motor/generator 100 of a split-stator type as shown in FIG. 5C or twin (separated type) motor/generators 110 as shown in FIG. 5D. Motor/generator 100 of the split-stator type, as shown in FIG. 5C, includes: a right stator 40A; a right rotor 42A faced toward right stator 40A; a right motor shaft 44A rotatably supported by means of a bearing on an outer casing 1000 on which right stator 40A is attached; a left stator 41A; a left rotor 43A faced toward left stator 41A; a left motor shaft 45A which is coaxial with right motor shaft 44A, rotatably supported by means of the bearing on outer casing 1000 on which left stator 41A is attached, and is rotatable independently of left motor shaft 44A. Each twin motor/generator unit 110 and 110 has mutually the same structure but is separated from each other with a space. The same reference numerals as those shown in FIG. 5C designate like elements. In this case, the coil connection of left stator 41A may be drive circuit 40 shown in FIG. 4A, left rotor 43A may be of the four pole pairs as shown in FIG. 5B, that of right stator 40A may be the drive circuit 30 shown in FIG. 4A and right rotor 42A may be of the two pole pairs as shown in FIG. 5B. It is also noted that although the number of neutral points in the case of four pole pair outer rotor 3-phase drive circuit shown in FIG. 1C are three, the number of neutral points may be varied. For example, the number of neutral points may be six and the number of coils interconnected may be two.

Figure 7:
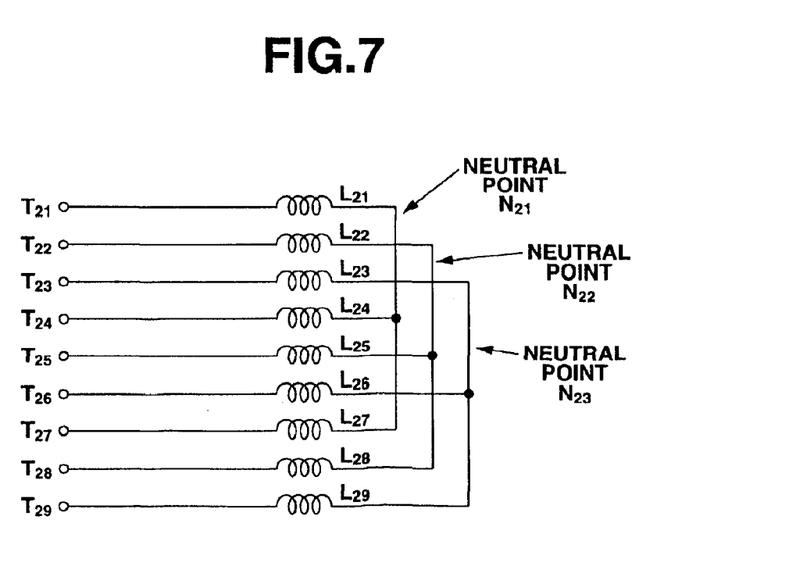
FIG. 7 is a connection diagram of a second preferred embodiment of the connecting method of the electric rotating machine according to the present invention.

FIG. 7 shows a diagram representing a second preferred embodiment of the feeder connecting method for the electric rotating machine according to the present invention. In the second embodiment, a nine phase motor is applicable. The number of stator slots (cores) are nine, the torque is developed according to one pole pair and 9-phase drive. Coils of L$_{21}$ through L$_{29}$ are wound on the respective stator slots, each coil being connected to respective terminals T$_{21}$ through T$_{29}$. A voltage expressed below is applied to each of terminals T$_{21}$ through T$_{29}$.

$$\text{Terminal } T_{21} : V \times \sin(\theta - 0), \tag{11}$$

$$\text{Terminal } T_{22} : V \times \sin(\theta - 40), \tag{12}$$

$$\text{Terminal } T_{23} : V \times \sin(\theta - 80), \tag{13}$$

$$\text{Terminal } T_{24} : V \times \sin(\theta - 120), \tag{14}$$

-continued $$\text{Terminal } T_{25}: V \times \sin(\theta - 160) \tag{15}$$

$$\text{Terminal } T_{26}: V \times \sin(\theta - 200), \tag{16}$$

$$\text{Terminal } T_{27}: V \times \sin(\theta - 240), \tag{17}$$

$$\text{Terminal } T_{28}: V \times \sin(\theta - 280), \text{ and} \tag{18}$$

$$\text{Terminal } T_{29}: V \times \sin(\theta - 320). \tag{19}$$

In equations (11) through (19), V denotes an amplitude of an applied voltage across the nine-phase motor and θ denotes a rotor's rotational position. As shown in equations (11) through (19), a current flowing through a first group having coils $L_{21}$, $L_{24}$, and $L_{27}$, a current flowing through a second group having coils $L_{22}$, $L_{25}$, and $L_{28}$, and a current flowing through a third group having coils $L_{23}$, $L_{26}$, and $L_{29}$ are mutually totally zeroed. Even if three individual neutral points $N_{21}$, $N_{22}$, and $N_{23}$ are connected to corresponding one of the three groups of the first, second, and third groups, a state of the voltage applied across and current flowing through each coil does not change. By doing this, it becomes possible to raise the rate of voltage utilization in the same way as described in the first embodiment.

The entire contents of Japanese Patent Application No. 2002-006991(filed in Japan on Jan. 16, 2002) are herein incorporated by reference. The scope of the invention is defined with reference to the following claims.

What is claimed is:

1. A method of connecting an electric rotating machine, the rotating machine comprising a plurality of rotors driven by means of a compound current and a power supply supplying the compound current to the rotating machine via a first predetermined number of feeders, the method comprising:

selecting a second predetermined number of the feeders on each of which a total sum of a current flow is zeroed when the second predetermined number of the feeders are interconnected at a neutral point by a third predetermined number of groups from among the first predetermined number of the feeders; and connecting each coil of the rotating machine between a corresponding one of the first predetermined number of the feeders and a corresponding one of the second predetermined number of the feeders for each of the third predetermined number of the groups, a product between the second predetermined number and the third predetermined number corresponds to that between a number of current phases in the compound current for driving a corresponding one of the rotors and a number of pole pairs of the corresponding one of the rotors.

2. A method of connecting an electric rotating machine as claimed in claim 1, wherein the second predetermined number of the feeders in each of the third predetermined number of the groups have respective current phases, none of the respective current phases in the second predetermined number of the feeders of each of the third predetermined number of the groups being 180 electrical degrees out of phase with respect to any other of the current phases in the same group.

3. A method of connecting an electric rotating machine as claimed in claim 1, wherein the second predetermined number of the feeders are six, the first predetermined number of the feeders are six, and the third predetermined number of the groups are two.

4. A method of connecting an electric rotating machine as claimed in claim 2, wherein the rotating machine comprises a compound motor, the compound motor including a stator having twelve stator cores, each stator core having a corresponding one of twelve coils, and inner and outer rotors, the inner rotor having two pole pairs, one end of each of first through sixth stator coils being connected to one end of each of seventh through twelfth coils sequentially and to the power supply via first through sixth terminals and wherein the other end of each of first, third, and fifth coils is connected to the other end of each of seventh, ninth, and eleventh coils via a first neutral point and the other end of second, fourth, and sixth coils is connected to eighth, tenth, and twelfth coils via a second neutral point, each coil being formed at a 30° angular interval.

5. A method of connecting an electric rotating machine as claimed in claim 4, wherein the compound motor has the outer rotor having four pairs of poles, each end of the first, fourth, seventh, and tenth coils is connected together at a third neutral point, each end of the second, fifth, eighth, and eleventh coils is connected together at a fourth neutral point, each end of the third, sixth, ninth, and twelfth coils is connected together at a fifth neutral point, the other end of each of the first and seventh coils is connected to the first terminal, the other end of each of the fourth and tenth coils is connected to the fourth terminal, the other end of each of the second and eighth coils is connected to the second terminal, the other end of each of the fifth and eleventh coils is connected to the fifth terminal, the other end of each of the third and ninth coils is connected to the third terminal, and the other end of each of the sixth and twelfth coils is connected to the sixth terminal.

6. A method of connecting an electric rotating machine as claimed in claim 5, wherein the first through sixth terminals receive the power supply respectively as follows:

first terminal $T_1$: $V_{IN} \times \sin(\theta in-0)+V_{OUT}(\theta out-0)$, second terminal $T_2$: $V_{IN} \times \sin(\theta in-60)+V_{OUT} \times \sin(\theta out-120)$, third terminal $T_3$: $V_{IN} \times \sin(\theta in-120)+V_{OUT} \times \sin(\theta out-240)$, fourth terminal $T_4$: $V_{IN} \times \sin(\theta in-180)+V_{OUT} \times \sin(\theta out-0)$, fifth terminal $T_5$: $V_{IN} \times \sin(\theta in-240)+V_{OUT} \times \sin(\theta out-120)$, and sixth terminal $T_6$: $V_{IN} \times \sin(\theta in-300)+V_{OUT} \times \sin(\theta out-240)$ and wherein $V_{IN}$ denotes a voltage amplitude value to cause the current to flow through the stator coils to develop a torque on the inner rotor, $V_{OUT}$ denotes the voltage amplitude value to cause the flow of the current through the stator coils to develop the torque on the outer rotor, θin denotes a rotational angle of the inner rotor, and θout denotes a rotational angle of the outer rotor.

7. A method of connecting an electric rotating machine, the rotating machine comprising a single rotor driven by a symmetrical N-phase alternating current having a single frequency and a power supply supplying the symmetrical N-phase alternating current to the rotating machine via a first predetermined number of feeders, the method comprising:

selecting a second predetermined number of the feeders on each of which a total sum of a current flow is zeroed when the second predetermined number of the feeders are interconnected at a neutral point by a third predetermined number of groups from among the first predetermined number of the feeders; and connecting each coil of the rotating machine between a corresponding one of the first predetermined number of the feeders and a corresponding one of the second predetermined number of the feeders for each of the third predetermined number of the groups, a product between the second predetermined number and the third predetermined number corresponds to that between a number of current phases in the compound current for driving of the rotor and a number of pole pairs of the rotor.

8. A method of connecting an electric rotating machine as claimed in claim 7, wherein the rotating machine comprises one pole pair nine-phase motor having nine stator core numbers and wherein the first predetermined number of the feeders are nine, the second predetermined number of the feeders are three, and the third predetermined number of the groups are three.

9. A method of connecting an electric rotating machine as claimed in claim 8, wherein the nine-phase motor has ninth terminals connected to each of the stator coils receive the following voltages of V×sin (θ−0); V×sin (θ−40); V×sin (θ−80); V×sin (θ−120); V×sin (θ−160); V×sin (θ−200); V×sin (θ−240); V×sin (θ−280); and V×sin (θ−320), wherein V denotes an amplitude of an applied voltage across the nine-phase motor and θ denotes a rotor angular position.

10. An electric rotating machine, comprising:
a plurality of rotors driven by means of a compound current;
a power supply supplying the compound current to the rotating machine via a first predetermined number of feeders;
a selecting section that selects a second predetermined number of the feeders on each of which a total sum of a current flow is zeroed when the second predetermined number of the feeders are interconnected at a neutral point by a third predetermined number of groups from among the first predetermined number of the feeders; and
a connecting section that connects each coil of the rotating machine between a corresponding one of the first predetermined number of the feeders and a corresponding one of the second predetermined number of the feeders for each of the third predetermined number of the groups, a product between the second predetermined number and the third predetermined number corresponds to that between a number of current phases in the compound current for driving a corresponding one of the rotors and a number of pole pairs of the corresponding one of the rotors.

11. An electric rotating machine, comprising:
a single rotor driven by a symmetrical N-phase alternating current having a single frequency;
a power supply supplying the symmetrical N-phase alternating current to the rotating machine via a first predetermined number of feeders;
a selecting section that selects a second predetermined number of the feeders on each of which a total sum of a current flow is zeroed when the second predetermined number of the feeders are interconnected at a neutral point by a third predetermined number of groups from among the first predetermined number of the feeders; and
a connecting section that connects each coil of the rotating machine between a corresponding one of the first predetermined number of the feeders and a corresponding one of the second predetermined number of the feeders for each of the third predetermined number of the groups, a product between the second predetermined number and the third predetermined number corresponds to that between a number of current phases in the compound current for driving of the rotor and a number of pole pairs of the rotor.

12. An electric rotating machine, comprising:
rotor means driven by means of a compound current;
power supplying means for supplying the compound current to the rotating machine via a first predetermined number of feeders;
selecting means for selecting a second predetermined number of the feeders on each of which a total sum of a current flow is zeroed when the second predetermined number of the feeders are interconnected at a neutral point by a third predetermined number of groups from among the first predetermined number of the feeders; and
connecting means for connecting each coil of the rotating machine between a corresponding one of the first predetermined number of the feeders and a corresponding one of the second predetermined number of the feeders for each of the third predetermined number of the groups, a product between the second predetermined number and the third predetermined number corresponds to that between a number of current phases in the compound current for driving rotor means and a number of pole pairs of the rotor means.

* * * * *